July 9, 1940.　　　　E. JACOBSON　　　　2,207,405
EXTRUSION PROCESS AND APPARATUS
Filed May 8, 1937
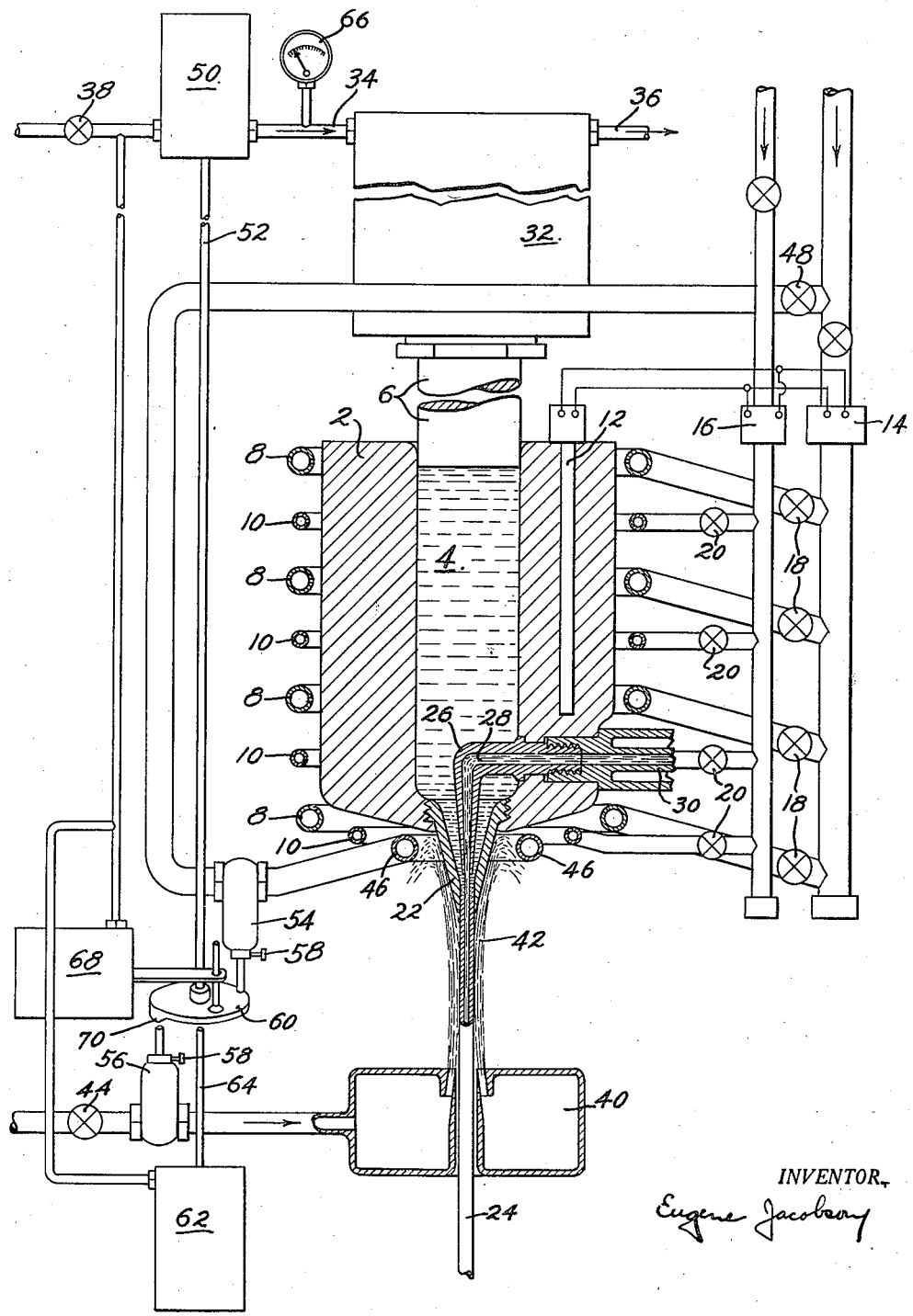
INVENTOR,
Eugene Jacobson Patented July 9, 1940

2,207,405

UNITED STATES PATENT OFFICE 2,207,405

EXTRUSION PROCESS AND APPARATUS

Eugene Jacobson, San Francisco, Calif.

Application May 8, 1937, Serial No. 141,571

26 Claims. (Cl. 207—10)

This invention relates to the forming of articles by plastic deformation from solid or semisolid material by forcing said material, usually under enormous pressure, out through a forming die. While directed particularly to the production of flux-core wire solder, the invention is generally applicable to a wide range of extrusion processes, products, and apparatus.

It is primarily an object of my invention, to speed up the extrusion process and apparatus without prejudice to other desirable results. It is further an object of my invention to provide improved control and reduce the requisite supervision of the extrusion process and apparatus. Further objects of my invention are to reduce the incidence of breakage or other defects in articles of any given thickness being extruded and/or to teach and provide processes and apparatus for producing thinner or otherwise more difficult extruded articles than could consistently or efficiently be produced heretofore, and to produce superior products efficiently.

Other and ancillary objects of invention will be suggested in the following description and in the use of the processes, apparatus and products of the invention.

In extruding materials, such as flux-core solder wire for example, practical extrusion speed has heretofore been severely limited, and any substantial increase above practical working speed yielded broken or malformed extruded wire. Not even that practical working speed could be attained if the temperature of the mass of solder in the extrusion press were not carefully regulated. So far as I am aware, the underlying cause of breakage or malformation of the extruded material when speed is excessive, was not known. It is known that overheating the mass of solder in the extrusion press will produce much the same effect as excessive speed; but so also will underheating the mass of solder.

Prior to conception of the present invention I set forth the following analysis to wit:

1. Malformed or broken wire is usually if not always caused by issuance from the extrusion die of the extruded wire or other article in too-nearly molten condition to be self-sustaining, i. e., the extruded article leaves the extrusion die at too high temperature.

2. Assuming that the mass of material in the extrusion press prior to extrusion does not exceed what experience shows to be correct temperature, the excessive temperature of extruded article cannot be cured by merely lowering the temperature of the mass of material in the extrusion press. The final temperature of the extruded article results not from one, but from two factors, viz., original temperature of the mass of material in the extrusion press plus the rise in temperature caused by extrusion. This rise in temperature caused by extrusion results from the heat generated by plastic deformation of the material being extruded, i. e., the work input to produce plastic deformation, is converted into heat. A certain additional amount of heat is of course generated by external friction. Below a certain point, nothing is gained by reducing the temperature of the mass of material in the extrusion press, because the lower is its temperature, the more work is required to cause its plastic deformation, the more heat is generated thereby, and the more its temperature will be raised during extrusion.

3. The rate of heat generation by the plastic deformation (and external friction) increases with increase in speed of extrusion, and for any given material and conditions, there is a critical velocity of extrusion above which the material extruded will be too-nearly molten to be self-sustaining, regardless of how low the initial temperature of the material be prior to extrusion.

On the basis of the foregoing analysis, my solution of the problem becomes readily understandable. Theoretically, the temperature of the material prior to extrusion is of less importance than the temperature at the end of extrusion. It is prescribed that that latter temperature be controlled; which for high extrusion velocities, entails rapidly abstracting heat from the material toward and at the end of its extrusion. The more rapidly heat can be abstracted during the actual extrusion, the higher can be the velocity of extrusion without detriment to the product. Accordingly my invention dictates intensively cooling the extrusion die and also dictates rapidly chilling the extruded product instantly upon its issuance from the extrusion die.

Water-cooled extrusion presses are not basically new as indicated by United States Patent Numbers 54,121 issued to Crooke, April 24, 1866, 770,997 issued to Beck and Townsend, September 12, 1904, and 1,741,813 issued to Boynton, December 31, 1929. In all instances of which I am aware, however, their purpose seems to be to cool the mass of material prior to extrusion, or to prevent destruction of the apparatus when very high melting-point metals are being formed. My invention however deals more with the incidence, positions, and relative intensities, of cooling throughout extrusion and to the control thereof under various and varying conditions of extrusion. It should be noted incidentally, that conventional practice in extrusion of relatively soft or low-melting point materials such as solder, generally resorts to heating instead of cooling the extrusion press. United States Patent Number 814,731 issued to Robertson March 13, 1906, is thus a more accurate illustration of conventional practice.

The drawing is an axial section of an extrusion press exemplifying the process and incorporating the apparatus of an embodiment of my invention. Various controls and accessories to the press are represented schematically and in elevation.

An extrusion press cylinder 2 may be filled by any convenient means with a mass 4 of solder or other material to be extruded. A plunger 6 is provided to exert tremendous pressure on the mass of material to be extruded. A filler opening (not shown) may be provided for filling the cylinder with molten material which solidifies into a hot ingot in the cylinder, or a (preferably hot) ingot may be inserted into the cylinder by retracting the plunger out of and far back from the cylinder. The cylinder is of extremely massive construction not only for strength, but in order to provide a large thermal body surrounding the material 4 and tending to equalize its temperature throughout the entire extrusion process. The cylinder is surrounded by alternate rings of gas burner jets 8 and water spray cooling jets 10 both controlled by a conventional selectively adjustable thermostat indicated generally at 12 and connected electrically or otherwise to power-actuated valves 14 and 16, to initiate and more or less increase gas supply to burners 8 when temperature of the cylinder drops more or less below a predetermined minimum; and to momentarily and periodically supply small quantities of water under pressure to the spray cooling jets 10 when temperature of the cylinder rises or remains above a predetermined maximum. In usual circumstances, with solder as the material being extruded, the water spray will seldom if ever be brought into play by the thermostat. Manually adjustable valves 18 and 20 respectively are provided for apportioning gas and water flow to each of the burner and spray nozzle rings 8 and 10.

The head end of the extrusion cylinder is provided with a hardened extrusion die 22 having an orifice out through which the wire solder or other extruded material 24 issues. When flux-core solder is to be formed, a flux-feeding nozzle 26 is provided, with its orifice positioned axially within the orifice of die 22. The flux 28 is supplied by conventional means (not shown) through a line 30 which is preferably steam-jacketed all the way to its entrance into the cylinder 2.

The plunger 6 is actuated in any convenient manner as by a conventional hydraulic press cylinder 32 served from any convenient source of pressure by a high pressure hydraulic pipe line 34, and is provided with a pressure-relief line 36.

Means for withdrawing plunger 6 on the return stroke are purely conventional and have not been illustrated. The framework and supports of the extrusion apparatus are not shown. Means are provided for accurately controlling the velocity and/or pressure of the plunger 6. Various complicated speed and/or pressure controls are provided in conventional refined practice, but for simplicity of illustration, a simple valve 38 in pipe 34 is indicated for that purpose.

Means are provided for suddenly chilling the extruded material promptly after its emission from die 22. An annular or other encircling-shaped coolant nozzle 40 is positioned axially under and spaced an appreciable distance below die 22. The coolant nozzle has a generally frusto-conical or other tapered encircling-shaped orifice pointed upward and adapted to emit a converging jet of coolant 42 upward and inward into ensheathing contact with the extruded material 24 issuing from die 22. Preferably fresh cool water, or other suitable coolant, is supplied at accurately controllable pressure to the nozzle 40. At low extrusion speeds pressure to the nozzle 40 is controlled as by a manually operable valve 44, to yield a jet of coolant 42 rising up almost but not quite into contact with die 22.

At high extrusion speeds however, pressure to the coolant nozzle is raised sufficiently to bring the coolant jet 42 into contact with the extrusion die 22. It will be noted that the coolant will impinge directly upon the die 22 at the actual discharge point of the orifice thereof. At maximum extrusion speeds, pressure to the coolant nozzle is increased further to carry the coolant jet up into ensheathing contact with the die 22 as shown in the drawing.

A ring of gas burners 46 surrounding the die 22, is provided to bring the die and material therein initially up to optimum extrusion temperature prior to initiation of extrusion and to maintain that temperature when extrusion is interrupted or slowed down to very low speeds. A manually operable valve 48 is provided to control gas supply to the burner ring 46.

Throughout the entire speed range from zero to maximum, pressure to coolant nozzle 40 and gas supply to the ring of burners 46, may be manually controlled to maintain, as nearly as possible, optimum temperature of the material being extruded (not in the press cylinder prior to extrusion) but at the actual region of extrusion; and if overheating does occur, to chill the material back down to self-sustaining temperature toward the end of and instantly after extrusion. With practice, a skilled operator can attain considerable proficiency at such manual control. In any event whether the actual control be manual, or automatic as subsequently to be described, the actual determination and calibration of the settings particularly of the coolant pressure which determines height of the coolant jet for various speeds, is empirically determined as follows:

1. With coolant supply to nozzle 40 shut off completely, start extrusion in conventional manner, but at extremely low speed, with burners 46 lit and high enough to provide satisfactory extrusion. While maintaining the speed of extrusion constant, gradually reduce the flame of burners 46 until malformation or breakage of the extruded article occurs or until excessive pressures are required for extrusion or until any other deleterious effect is produced. Then increase the burner flame safely above the point at which the deleterious effect was produced; still keeping the extrusion speed the same. Calibrate the gas valve opening and measure the speed of extrusion, so the same gas supply to burner 46 may always be reproduced for that very low extrusion speed.

2. Maintain extrusion speed and gas supply constant at the values above calibrated, and open the coolant valve to nozzle 40 sufficiently to produce a coolant jet 42 extending up almost but definitely and safely not quite into contact with the die 22. If a deleterious effect is produced, increase extrusion speed sufficiently to safely avoid that deleterious effect. Calibrate the coolant valve opening and measure this latter speed, so the coolant jet may always be brought up to but not in contact with die 22 when that speed is reached.

3. Maintaining the coolant supply to nozzle 40 calibrated above, increase extrusion speed in gradual steps and calibrate proper gas supply to burners 46 as in (1) above for each extrusion speed up to the point where the burners 46 are shut off entirely. Calibrate the gas supply valve for each speed..

4. With burners 46 shut off, increase coolant supply to nozzle 40 in gradual steps into and gradually higher into ensheathing contact with die 22; at the same time increasing extrusion speed safety above the point at which a deleterious effect is produced, for each height of coolant jet 40; until the coolant jet completely ensheaths die 22. Calibrate the coolant supply valve for each speed..

5. With burners 46 shut off, and coolant jet 40 completely ensheathing the die 22, increase extrusion speed gradually until a deleterious effect is produced.

6. In successive runs of the extrusion press under the conditions outlined in (5) above, vary the setting of thermostat 12, above and below the temperature conventionally employed in extrusion press practice; at all times maintaining extrusion speed up to the point of incipient breakage or malformation of the formed article or other deleterious effect until that true optimum setting of thermostat 12 is determined at which maximum extrusion speed is attainable. With thermostat 12 so set, reduce extrusion speed safely below the point of incipient malformation or other deleterious effect. This latter setting is the maximum speed which should be used in practice for the given conditions, and will be found to be very greatly in excess of extrusion speeds which had heretofore been practically attainable. If a substantial change has been made in the setting of thermostat 12, complete recalibration of the apparatus for all speeds would be advisable. If the optimum setting of thermostat 12 for maximum extrusion speed causes any deleterious effect at lower speeds, of course different settings of thermostat 12 may be employed for different speeds.

The heretofore mentioned conventional temperature of the mass of metal in the press prior to extrusion, is usually determined empirically in each installation, as that temperature yielding most satisfactory results. It will vary somewhat with different materials and conditions of extrusion, but is somewhere in the neighborhood of thirty per cent below the maximum temperature of self-sustaining solidity of the material; the material then being in a hot semi-plastic state. That conventional temperature will herein be termed "normal initial temperature" as distinguished from the "optimum initial temperature" determined by the optimum setting of thermostat 12 described in section 6 of the foregoing calibration.

It has been mentioned that conventional practice in extrusion of relatively soft low melting point materials such as solder, generally resorts to heating instead of cooling. Experience has shown empirically, and it is the common practice, to avoid heating or even to employ a small degree of cooling when a higher melting point material such as lead is being extruded. Thus for example, a die heated just sufficiently to compensate for heat loss to the atmosphere when solder is being extruded, would be approximately equivalent to a conventional die exposed to uncompensated heat loss to the atmosphere when lead is being extruded. In this sense, the subsequently defined degrees of cooling are subject to the material being extruded. When solder of a given shape, size and temperature is being extruded at a given speed, a given degree of ensheathment of the described die in cool water will result in the abstraction of a certain number of heat units per unit time. If the temperature is raised as by similarly extruding a material of higher melting point than solder, more heat units will be abstracted per unit time at the same speed and amount of coolant ensheathment. This mere increase in rate of heat flow due to extrusion of a higher melting point material when there is no change in the temperature or area of contact of the coolant, will not be construed as an increased degree of cooling as the term is used herein; and on the contrary, insofar as the scope of this invention is concerned, can be deemed in effect, a relative diminution of the degree of cooling, since conventional practice dictates some moderately increased cooling provision with higher melting point materials.

The expression "moderate cooling" as employed herein includes all the lower degrees of cooling up to and including the degree of cooling exhibited when lead is being extruded, by purging with high velocity approximately two hundred and fifteen Fahrenheit degree steam as in U. S. Patent 2,002,690 issued May 28, 1935, to H. F. Carter. If solder were substituted for lead as the material being extruded, the aforedescribed purging with steam would yield sub-intensive cooling.

The expression "intensive cooling" as employed herein includes all the higher degrees of cooling down to a degree of cooling substantially above moderate cooling. The transition range from moderate to intensive cooling is termed "sub-intensive cooling." The transition range exceeds the degree of transition entailed in substitution of solder for lead as the material being extruded.

The expression "super-cooling" as employed herein includes that upper range of intensive cooling substantially above half the maximum intensity attainable with cool water in substantially completely ensheathing direct contact with the die as described herein.

The expression "moderate speed" as applied to extrusion herein, includes all lower speeds up to and including the maximum speed at which extruded material such as lead would issue in self-sustaining solid state with moderate cooling and from normal initial temperature as in U. S. Patent 2,002,690 aforesaid.

The expression "intense speed" as applied to extrusion herein, includes all higher speeds down to a speed substantially above moderate speed. The transition range from moderate to intense speed may be termed "sub-intense speed." The transition range exceeds the transition involved in substituting sub-intensive cooling with solder for the aforedescribed moderate cooling with lead.

The expression "moderate cooling" as employed herein, includes the upper range of intense speeds down to the maximum speed at which extruded material would issue in self-sustaining solid state with minimum super-cooling and from an initial temperature defined by the optimum setting of thermostat 12 as aforedescribed.

The term "generally," when applied herein to qualify a proportional or other relationship, is consistently used broadly enough to include other than a simple or exact relationship or proportionality. Thus, a step-by-step adjustment of two variables could be said generally to follow a relationship or proportionality. The curve or function of a general relationship or proportionality need not be simple, it may be so complex as to not exactly fit any mathematical equation. The term does however, indicate a general tendency followed over or affecting a substantial or significant portion of the range of variation and not a mere chance, or isolated and immaterial, condition.

As aforementioned, extrusion is a heat-generating process; and therefore, by definition, it is adiabatic when no heat is externally added or subtracted during extrusion. Conventional normal extrusion through an uncooled die is approximately adiabatic; departing therefrom only by the small heat loss to the atmosphere, and becoming exactly adiabatic if the die be heated just sufficiently to compensate for that heat loss. Cooling of the die abstracts heat during extrusion, and causes a shift away from adiabatic toward isothermal. In actual operation at the speeds and cooling rates described in sections 1 to 4 inclusive of the aforedescribed calibration, the extrusion, instead of being adiabatic, will be not far from isothermal; i. e., the metal being extruded will issue from the die at a temperature not far removed from that of the mass of metal in the press prior to extrusion. Moreover, the metal will be extruded from the die at approximately constant temperature, irrespective of speed, over the entire range described in sections 1 to 4 inclusive of the foregoing calibration; the degree of cooling being increased proportionately as the speed increases. It is only at the higher speeds described in sections 5 and 6 of the foregoing calibration, that extrusion speed is raised without further increase of the already maximum intensity of cooling, thus causing the material to issue from the die at higher temperature.

If the intense extrusion speeds of this invention were not accompanied by the intensive cooling hereof, the material would issue from the die at a temperature above that of its self-sustaining solidity, and no useful product would result. Conversely, if the intensive cooling of this invention were not accompanied by the intensive speeds hereof, the material being extruded would be chilled down below its semi-plastic state, and the extrusion press would freeze up.

It has been stated herein as a teaching of this invention, that the rate of heat generation due to plastic deformation and external friction during extrusion increases with reduction of initial temperature prior to extrusion. This is due to the fact that radically higher extrusion pressure would be required conventionally to extrude initially cool material than to extrude initially hot material. Most extrusion presses are provided with a pressure gauge in the hydraulic actuating system similar to the gauge 66 hereinafter described. It is common practice, when that gauge shows excessive pressure, for the extrusion press operator to raise the initial temperature. Within the range of all conventional extrusion speeds it is common observation that extrusion pressure as measured by this gauge, increases with increase of extrusion speed; or, as more usually expressed, increased pressure increases extrusion speed and decreased extrusion pressure decreases extrusion speed. However, if extrusion speed be increased to the point where semi-molten metal spews from the die, extrusion pressure will cease to rise with speed increase. If, at a speed just sufficient to cause emission from an uncooled die of semi-molten material, the die be cooled just sufficiently to restore extrusion to emission of material in self-sustaining solidity, the extrusion pressure will be restored near to the normal pressure-speed and pressure-initial temperature relationships. As the speed and intensity of cooling are progressively raised above moderate values of normal operation it will be found that the steeply ascending curve of the relationship between pressure and initial temperature tends to level off, until at relatively high intense speeds and intensive die cooling, a condition is reached where substantial variation of the temperature maintained by thermostat 12 causes little change in extrusion pressure. This condition is inherent in the aforedescribed method of operation, and its explanation is that at very high speeds of operation the heat generated at the areas of external friction and of plastic deformation raises the local temperatures of those areas of even an initially cold material up to hot semi-plastic condition. Thus the pressure required for extrusion of initially cold material at the higher intensive speeds achieved by this invention would, even with the corresponding intensity of die cooling, not be greatly in excess of the pressure required to extrude initially hot material at those same speeds and cooling intensities. At such speeds in the absence of intensive cooling, even initially cool material would spew out of the die in molten condition, and extrusion pressure would not be appreciably higher than at normal or moderate speeds with initially hot material. With the corresponding intensive die cooling at those higher speeds, extrusion pressure will follow the speed-pressure relationship as at lower speeds, but not the steeply ascending speed-initial temperature relationship.

It will be noted that the foregoing calibration prescribes setting the apparatus to produce an extruded article near minimum permissible temperature at any given low or moderate speed; and that only at maximum speed will the formed article come up to maximum permissible temperature. Obviously, if preferred, the apparatus may be calibrated to yield any desired temperature of formed article between maximum and minimum permissible temperatures for any or all speeds. Thus there would be considerable virtue to calibrating the apparatus to yield the extruded article at a temperature substantially mid-way between maximum and minimum permissible temperatures for all but very high extrusion speeds. The apparatus should be recalibrated when substantial changes are made in the material or dimensions of the article extruded. If the original calibration be made to yield an extruded article of average material and dimensions at a temperature mid-way between maximum and minimum permissible temperatures for all, or all but very high velocities; then considerable departure from such average material and dimensions can be made without entirely recalibrating the apparatus.

For regular manual operation, the operator need merely reproduce the calibrated settings of the various controls for any given speed. In regular operation, it is advisable to bring the extrusion press gradually, or step by step, up to maximum speed; adjusting the various controls step by step in correspondence with the proper settings for each speed.

The manual controls herein are illustrated as simple manually operated valves, 38 for speed control, 48 for gas supply to burners 46, 44 for water supply to nozzle 40, and a conventional adjusting knob (not shown) for the thermostat 12. Marks may be made on the stems of each of these valves to calibrate their opening for various speeds. In refined practice of course, various more complicated and exact flow-determining means may be employed. The selection of proper flow determinants may be referred to any one of several companies which specialize in this character of equipment, which is generally cataloged under the heading of "regulators."

The speed of extrusion may be measured in any convenient manner and will in general be proportional to the speed or rate of flow of hydraulic actuating fluid through the pipe line 34. Thus for manual operation, the operator may estimate speed during extrusion, by the amount of opening of valve 38 in line 34. In automatic control next to be described, the pressure supply to coolant nozzle 40 is automatically governed generally in proportion to the rate of flow through line 34, and the gas supply to burners 46 is governed generally in inverse proportion thereto.

For automatic operation, a flow-responsive device 50 is interposed in pressure pipe 34 which motivates the extrusion press. Any desired flow-responsive device may be employed with or without remote control or servo-motor operation, so long as it is capable of responding accurately to the velocity or flow rate through pipe 34. A suitable type of flow responsive device is described in Patent Number 2,017,311 issued October 15, 1935, to Eugene Jacobson. As illustrated herein, the flow-responsive device 50 actuates a stem 52 in and out in response to the velocity or flow in pipe 34. At position of zero flow through pipe 34 the stem 52 holds a gas valve 54 in the gas supply line to burners 46 full open. As flow through pipe 34 increases to moderate rates the stem 52 moves out to decrease the opening of and finally close gas valve 54 and to gradually open a valve 56 in the coolant pressure supply pipe to coolant nozzle 40 until the valve 56 is wide open when flow through pipe 34, and therefore the speed of extrusion, is very great. The flow-responsive device should be adjusted to reproduce the conditions specified above for manual operation. The manner in which this flow-responsive device may be adjusted to any desired characteristics is described in the aforesaid patent. More complicated flow-responsive devices incorporating remote or servo-motor control are even more readily adjustable to produce whatever characteristics are desired. Such devices may be obtained from manufacturers specializing in so-called "regulators."

Alternative means for controlling the valves 54 and 56 generally in response to the speed of extrusion will suggest themselves. When it is desired to incapacitate the automatic controls for valves 54 and 56, and revert to manual control that can be done by opening valves 54 and 56 wide open and locking them in that position by means of set screws 58. Manual valves 44 and 48 will then be controlling. Conversely, when automatic control is desired, valves 44 and 48 are opened sufficiently far to pass the maximum amounts of water and gas required respectively for maximum and zero speeds of extrusion. Springs (not shown) within the valves 54 and 56 tend to close these valves; when they are not held open by the stem 52. It will be observed that a disc 60 at the end of stem 52 is provided to transmit motion of the stem to the valves.

Auxiliary means are provided to incapacitate the flow responsive device 50 at such times as the plunger 6 may be moved without causing extrusion. Thus, for example, when extrusion cylinder 2 has been filled with a new charge or ingot of material, the plunger 6 will move a considerable distance inward before extrusion starts. At such times, flow will take place through hydraulic pressure supply pipe 34, but pressures therein will be lower than when extrusion is taking place. Accordingly a pressure responsive device, indicated generally at 62, is provided, with a stem 64 extending toward the stem 52 of flow responsive device 50. A strong spring (not shown), within the pressure device, tends to push stem 64 into abutment with stem 52 to prevent outward movement of stem 52 in response to flow. The pressure-responsive device is connected into pipe 34, and a plunger (not shown) therein is adapted to retract its stem 64 counter to the strong spring therein when pressure in pipe 34 is of the magnitude attained when extrusion is taking place.

A pressure gauge 66 in pipe 34 will be of assistance to the operator in setting his controls. Excessive pressure in pipe 34 for any given velocity of extrusion will be indicative of insufficient temperature of the mass 4 of material prior to extrusion or of overcooling of the die 22 or both and may dictate some adjustment of the controls involved.

With accurate thermostatic control of temperature of the mass 4 of material prior to extrusion, excessive pressure in line 34 would indicate overcooling of die 22. Accordingly a second pressure-responsive device 68 connected to the line 34 may be arranged to operate a micrometer adjusting cam 70 formed on disc 60 at the end of stem 52 of the flow-responsive device; in effect slightly reducing the opening of valve 56 in the coolant supply line to nozzle 40, when pressure in line 34 becomes excessive, and vice versa. The pressure-responsive device 68 is limited and calibrated to come into play only at and above the pressures entailed by extrusion of sufficient speed to bring the coolant jet up into contact with the die 22.

Where such complication is warranted, the mass of material 4 prior to extrusion, can be maintained at optimum temperatures for all speeds by connecting the selectively adjustable thermostat 12 to the flow-responsive device 50 for automatic variation thereby. This complication has not been illustrated in the drawing.

All gas burner rings have their burner orifices directed generally radially inward toward the press cylinder or die. Appropriate drainage means (not shown) will be provided to drain out any coolant water which might collect in the burners. Long-flame pilot lights (not shown) are provided for igniting the burners and are positioned away from or are otherwise protected from extinction by the coolant sprays or jet.

While the upwardly-directed counterflow jet of coolant illustrated in the drawing, is decidedly preferred, the coolant could of course be brought into contact with the extruded material and nozzle in other ways. Thus for example, a coolant nozzle surrounding but spaced annularly from die 22 could be provided to emit an inwardly converging jet of coolant downward upon and against the die 22 from which it would flow down along the extruded material 24. Instead of varying the pressure supply to a nozzle so-positioned, the entire nozzle would be adjustably or automatically moved up or down to bring the jet more or less into contact with the die or to issue directly into contact with extruded material 24 without first contacting the die. Similarly a tank of coolant could be substituted for the coolant nozzle and the entire tank or the level of coolant therein could be raised or lowered to bring the coolant more or less into contact with the extruded material and/or with the extrusion die.

While an arrangement wherein the die 22 is directed vertically downward is preferred, the die could be placed horizontally or at other incidence, and coolant could be poured or emitted thereupon.

A further desirable purpose may be accomplished if some sacrifice of high maximum extrusion speed be made. If the temperature of the mass of material 4 prior to extrusion be raised sufficiently to produce a broken or malformed article in the absence of coolant application to the extruded article 24 and/or die 22; there will be a very substantial reduction in the otherwise enormous pressure required for extrusion. Much of that saving in pressure may be retained, and still a satisfactory extruded article may be made despite the excessive temperature of the mass of material 4, by bringing the coolant jet 42 into contact with the article instantly after extrusion and preferably also into contact with approximately the lowermost third of die 22. Maximum practical extrusion speed under this condition of operation will of course, not be as great as with optimum temperatures of material 4; but very much lower extrusion pressures may be employed. The material being extruded will in fact be cooled down to self-sustaining temperatures during the latter part of and instantly after extrusion. The apparatus would have to be recalibrated especially for this mode of operation.

This invention has an ancillary but important aspect in the production of materials such as flux-core solder. The common fluxes, such as rosin and aqueous zinc chloride solution, are more or less volatile at temperatures below the melting point of the ensheathing solder, and some of these fluxes also rapidly deteriorate at elevated temperatures. By preventing overheating of the ensheathing material during extrusion, and by chilling the extruded product instantly after extrusion, the duration of exposure of the flux to high temperature is greatly diminished as is also the maximum temperature. Thus a product is produced in which the flux remains substantially undeteriorated. Moreover, the risk of building up vapor pressures within the core of the hot newly extruded solder is minimized. The voids or discontinuities in the flux core caused by pockets of flux vapor are also practically eliminated, and a compact continuous regular core of flux is assured.

Most materials of commerce have at least a minute melting range, as distinguished from a perfectly sharply defined melting point. In dealing with materials having a sharp melting point or a melting range impractically small for measurement, the heat content will vary with the degree of moltenness and can be availed of for measurement or determination. Thus for example, the expression "a temperature above self-sustaining solidity", will be construed to include the melting point of a material having a sharply defined melting point, and in that case will connote a heat content above self-sustaining solidity.

I have described certain embodiments and steps of my invention in detail, but it is emphasized that these embodiments and steps are illustrative, and not inclusive of all the forms and aspects which my invention may assume. Certain of the objects or certain portions or combinations of the objects of my invention may be attained with the use of less than all its advantageous features and steps or with modifications within its purview. It is petitioned that my invention be limited only by the claims constituting its final determination.

I claim:

1. In an extrusion process, the steps of controlling the temperature of the material to be extruded, independently controlling the temperature of the material being extruded, and independently controlling the temperature of the material which has been extruded.

2. The combination with an extrusion press having a die through which material is extruded, and means for forcing material to be extruded through said die; of cooling means for rapidly extracting heat from said die, and automatic means controlled by the speed of extrusion for controlling said cooling means; said automatic means being sufficiently independent of extrusion pressure to operate in response to a change of speed involving substantially no change of pressure.

3. In an extrusion process wherein material is forced out through the orifice of a die and wherein purging of the die beyond its orifice with high velocity steam at a temperature of two hundred and ten degrees permits a given maximum speed of extrusion of said material to a final temperature just safely below its maximum temperature of self-sustaining solidity from an initial temperature in the neighborhood of thirty percent below said maximum temperature, the steps of extruding material at a speed materially and substantially greater than said given maximum and of cooling said material near the end of its extrusion with substantially and materially greater intensity than by the purging aforesaid.

4. In an extrusion process wherein material is forced out through the orifice of a die and wherein, with purging of the die beyond its orifice with high velocity steam at a temperature of two hundred and ten degrees, a given speed of extrusion raises the temperature of material issuing from the die near to but safely below its maximum temperature of self-sustaining solidity from an initial temperature in the neighborhood of thirty per cent below said maximum; the steps of cooling said die with intensity sufficient substantially to prevent said rise in temperature at said given speed and of extruding at a speed substantially and materially greater than said given speed.

5. In a process of extrusion wherein hot semiplastic material is forced out of an extrusion die, and wherein, in the absence of substantial cooling of said die, the maximum speed of extrusion which will permit said material to issue from said die in self-sustaining solid state is herein designated S, the steps of so intensively cooling said die as to reduce the temperature of said material being extruded through said die substantially below the semi-plastic hot state at said speed S, and of extruding said material at a speed so far in excess of S as to maintain said material being extruded in hot semi-plastic state despite said intensive cooling of the die.

6. In an extrusion process, wherein material is forced out through an extrusion die and wherein at normal speed the pressure required for adiabatic extrusion of initially cool material is radically greater than pressure required for initially hot material, the steps of extruding said material at a speed so far above normal as to require pressure for adiabatic extrusion of initially cool material more nearly approximating that required at normal speed for initially hot material, and of intensively cooling said die during extrusion.

7. In an extrusion process, wherein material is forced out through an extrusion die and wherein at normal speed the pressure required for adiabatic extrusion of initially cool material is radically greater than pressure required for initially hot material, the steps of extruding said material at a speed so far above normal as to require pressure for adiabatic extrusion of initially cool material more nearly approximating that required at normal speed for initially hot material, and of intensively cooling said die during extrusion and said material immediately after issuance from said die.

8. In an extrusion process, wherein material is forced out through an extrusion die, the steps of extruding said material at a speed so great that initially cold material would be heated by adiabatic extrusion to a temperature above that of self-sustaining solidity, and of intensively cooling said die during extrusion.

9. In an extrusion process, wherein material is forced out through an extrusion die, the steps of extruding said material at a speed so great that initially cold material would be heated by adiabatic extrusion to a temperature above that of self-sustaining solidity, and of intensively cooling said material near the end of its extrusion.

10. In an extrusion process, wherein material is forced out through an extrusion die, the steps of extruding said material at a speed so great that initially cold material would be heated by adiabatic extrusion to a temperature above that of self-sustaining solidity, and of so intensively cooling said die that initially hot material will issue at said speed therefrom in self-sustaining solid state.

11. In an extrusion process, wherein material is forced out through an extrusion die, the steps of extruding said material at a speed so great that initially cold material would be heated by adiabatic extrusion to a temperature above that of self-sustaining solidity, and of so intensively cooling said material near the end of its extrusion that initially hot material may be extruded at said speed and be retained unruptured after extrusion.

12. In a process of extrusion wherein material is forced out of a die, the steps of intensively cooling said die with a cool liquid coolant and of extruding at a speed not less than sufficient to cause isothermal extrusion of initially hot material through said intensively cooled die.

13. In an extrusion process wherein material is forced out through a die, the steps of heating said die prior to extrusion, avoiding both heating and substantial cooling of said die over an appreciable range of moderate extrusion speeds, and intensively cooling said die with a cool liquid coolant at great extrusion speeds.

14. In an extrusion process wherein material is forced out through a die, the steps of initiating and raising extrusion to moderately high speed with a substantially uncooled die, thereafter cooling said die and progressively increasing said cooling to a final value of intensive cooling equal to that attainable by contact of cool liquid coolant over a large area of said die, and during said progressive increase of cooling the step of progressively increasing said speed to a final value substantially above the maximum speed at which the material would be extruded in self-sustaining solid state from a moderately cooled die.

15. In an extrusion process wherein material is forced out through a die, the steps of intensively cooling said die with a cool liquid coolant at great speeds of extrusion and of varying the intensity of said cooling substantially without thermal lag and generally in proportion to and in phase with variation of speed of extrusion, whereby rapid cessation of extrusion causes substantially no overcooling of said die and rapid increase to great speed causes substantially no overheating thereof.

16. In an extrusion process wherein material is forced out through an extrusion die, the steps of cooling said die and of controlling heat abstraction by altering the extent of surface of the die subjected to said cooling.

17. In a process wherein material is emitted from a die, the steps of directing said die downwardly to facilitate free drainage therefrom, and of applying liquid coolant to an exposed lower portion of said die only during substantially high speed emission of said material.

18. In a method of cooling extrusion apparatus, the steps of directing a stream of liquid coolant upon such portions of the apparatus as are to be cooled, while providing for prompt free drainage of said liquid coolant out of thermal contact therewith, whereby thermal lag upon cessation of coolant supply is minimized.

19. In a method of cooling extrusion apparatus, the step of spraying liquid coolant upon a portion of said apparatus to be cooled under conditions providing prompt cessation of thermal contact of said liquid coolant therewith when said spraying is terminated.

20. In combination with an extrusion press, an extrusion die and means for bringing said die into intimate thermol contact with a liquid coolant; said die and press being substantially free of entrapping passages in intimate thermal contact with said die into which said liquid coolant might enter.

21. In an extrusion process wherein material is forced by plastic deformation through the orifice of an extrusion die, and wherein said die is generally cooled during extrusion, the steps of altering the speed of extrusion up to and including intense speed while varying the degree of cooling of said die up to and including intensive cooling and generally in direct proportion to the speed of extrusion.

22. In an extrusion process wherein material is forced by plastic deformation through the orifice of an extrusion die, and wherein said die is generally cooled during extrusion, the steps of altering the speed of extrusion up to and including intense speed while varying the degree of cooling of said die up to and including intensive cooling and generally in direct proportion to the speed of extrusion for a given extrusion pressure and generally in inverse proportion to the extrusion pressure for a given velocity of extrusion.

23. In an extrusion process wherein material is forced by plastic deformation out through an extrusion die, and wherein heat is generated by and generally in proportion to the speed of extrusion, the steps of extruding material at different speeds, and of controlling the temperature of said die at different extrusion speeds in degree and proportion to maintain approximately constant temperature of material emitted from the die over a substantial range of extrusion speeds to and including a speed requiring intensive cooling of said die to effect said temperature control.

24. In a process wherein hot material is emitted from a die, the steps of applying coolant into intimate thermal contact with said die, and of moving the area of application of said coolant in response to change of speed of emission of said material, while maintaining said area of coolant application substantially diametrally symmetrical with said material in said die.

25. In a method of treating material emitted from a die, the steps of applying a coolant directly only to the emitted said material at relatively low speeds of emission of said material, and of moving the point of application of said coolant into intimate thermal contact with said die at relatively high emission speeds of said material.

26. In a method of treating hot material emitted from a die, the steps of applying a coolant directly into contact with said material upon its emission, and of moving the point of application of said coolant with change of speed of emission of said material.

EUGENE JACOBSON.